United States Patent [19]

Barthelemy et al.

[11] Patent Number: 4,950,728
[45] Date of Patent: Aug. 21, 1990

[54] THERMALLY STABLE (IMIDE/AMIDE)/(UREA/SILOXANE) BLOCK COPOLYMERS

[75] Inventors: Pascal Barthelemy, Lyons; Yves Camberlin, Caluire; Philippe Michaud, Villeurbanne, all of France

[73] Assignee: Rhone-Poulenc Chimie, Courbevoie, France

[21] Appl. No.: 202,544

[22] Filed: Jun. 6, 1988

[30] Foreign Application Priority Data

Jun. 5, 1987 [FR] France .................................. 87 08105

[51] Int. Cl.$^5$ ............................................ C08G 77/455
[52] U.S. Cl. .......................................... 528/26; 528/27; 528/28; 528/38; 525/431; 525/436
[58] Field of Search ............................ 528/26, 27, 28; 525/431, 436

[56] References Cited

U.S. PATENT DOCUMENTS

| | | | |
|---|---|---|---|
| 3,803,100 | 4/1974 | Izumi et al. | 528/48 |
| 3,884,880 | 5/1975 | Disque et al. | 528/49 |
| 3,887,636 | 6/1975 | Juliano et al. | 528/28 |
| 4,395,527 | 7/1983 | Berger | 528/38 |
| 4,590,224 | 5/1986 | Frisch | 521/155 |

FOREIGN PATENT DOCUMENTS 0196939 10/1986 European Pat. Off. .
3432509 3/1985 Fed. Rep. of Germany .

*Primary Examiner*—Lewis T. Jacobs
*Assistant Examiner*—Ralph H. Dean, Sr.
*Attorney, Agent, or Firm*—Burns, Doane, Swecker & Mathis

[57] ABSTRACT

Thermally stable block copolymers, well adapted for the production of coating films, include recurring imide/amide blocks of the formula:

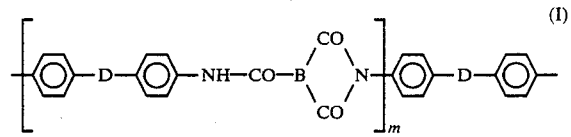

and recurring urea/siloxane blocks of the formula:

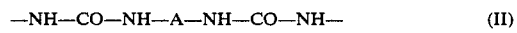

wherein A is a divalent diorganosiloxane radical of the formula

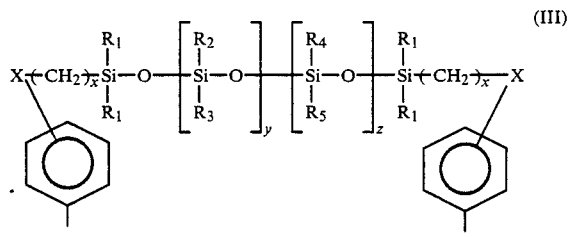

10 Claims, No Drawings

THERMALLY STABLE (IMIDE/AMIDE)/(UREA/SILOXANE) BLOCK COPOLYMERS

BACKGROUND OF THE INVENTION

1. Field of the Invention

The present invention relates to novel thermally stable block copolymers comprising (imide/amide) and (urea/siloxane) blocks.

2. Description of the Prior Art

The combination of recurring imide and/or amide and siloxane units has been employed to advantage in the preparation of polymers useful in insulating coating applications for which the coating must have excellent heat stability. U.S. Pat. No. 4,395,527, for example, describes polymers of this nature. More precisely, this '527 patent describes poly(imide/amides) containing recurring siloxane units which are the reaction product of a diamine having a diorganopolysiloxane group with a monoanhydride of a tricarboxylic acid, namely:

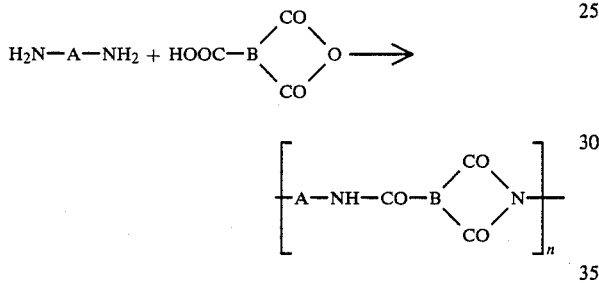

where A represents a divalent diorganopolysiloxane group.

Other patents which describe thermally stable polymers comprising imide and/or amide and siloxane recurring units are U.S. Pat. No. 3,274,155, U.S. Pat. No. 3,325,450, U.S. Pat. No. 3,553,282 and U.S. Pat. No. 4,011,279. However, such prior art does not even allude to novel block copolymers which comprise both (imide/amide) and (urea/siloxane) blocks.

SUMMARY OF THE INVENTION

Accordingly, a major object of the present invention is the provision of a novel class of thermally stable block copolymers structurally comprising:

(imide/amide) blocks of the formula:

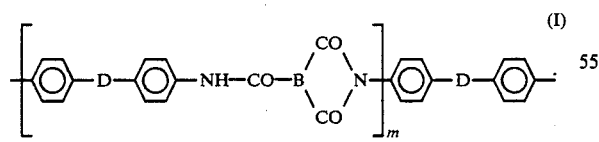

in which:

D represents a simple valence bond or one of the groups:

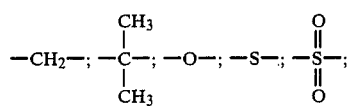

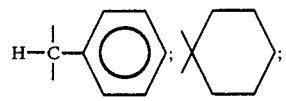

B represents a trivalent substituted or unsubstituted aromatic radical, or two such radicals joined together by a simple valence bond or one of the groups:

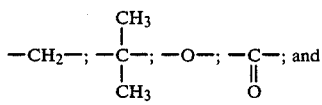

m is a positive number equal to at least 1 and preferably ranging from 1 to 10; and (urea/siloxane) blocks of the formula:

$$-NH-CO-NH-A-NH-CO-NH- \quad (II)$$

in which:

A represents a divalent diorganosiloxane radical of the formula:

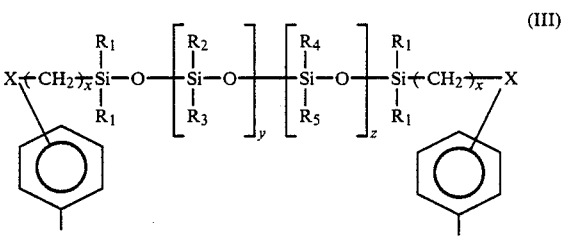

in which:

X, which is in the ortho-, meta- or para-position relative to the carbon atom of the benzene ring with the valence bond depending therefrom, represents one of the following atoms or groups:

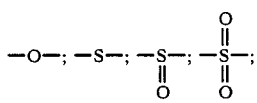

$R_1$, $R_2$, $R_3$, $R_4$ and $R_5$, which may be identical or different, are each a linear or branched chain alkyl radical having from 1 to 12 carbon atoms, or a substituted such alkyl radical bearing one or more chlorine, bromine or fluorine atom substituents or a —CN group substituent, or a phenyl radical optionally substituted by one or more alkyl and/or alkoxy radicals having from 1 to 4 carbon atoms or by one or more chlorine atoms;

the symbol x is an integer ranging from 2 to 8; and the symbols y and z represent identical or different integral or fractional numbers, the sum of which ranges from 0 to 100.

The novel copolymers of this invention are characteristically prepared by conducting the following two reaction stages in sequence, in the same reactor:

Stage (a), in which:

an oligomer having terminal isocyanate groups is prepared by heating the reactants (i) and (ii) below, at a temperature ranging from 50° C. to 200° C. and in the presence of an organic solvent or a mixture of organic solvents, wherein:

(i) is a diisocyanate of the formula:

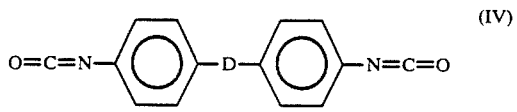
(IV)

in which D is as defined above in formula (I), and (ii) is a tricarboxylic acid monoanhydride of the formula:

(V)

in which B is as defined above in formula (I), with proportions of the reactants (i) and (ii) being such that the ratio:

$$\frac{\text{number of moles of diisocyanate (i)}}{\text{number of moles of anhydride (ii)}}$$

ranges from 1.1 to 2; and said heating being carried out for a sufficient time such that all of the functional groups of the anhydride (ii) are reacted; and Stage (b), in which:

the reaction mixture obtained at the end of stage (a), containing the oligomer having terminal isocyanate groups, is reacted, at a temperature ranging from 50° C. to 160° C., with (iii) a diamine having a diorganopolysiloxane group of the formula:

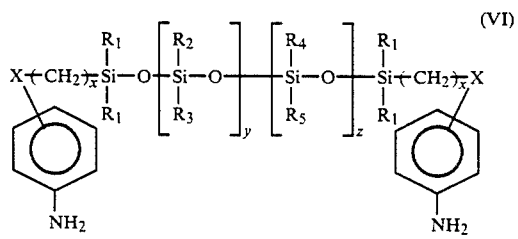
(VI)

in which X, $R_1$, $R_2$, $R_3$, $R_4$, $R_5$, x, y and z are as defined above in formula (III), with the proportions of reactant (iii) being such that the ratio:

$$\frac{\text{number of moles of diaminesiloxane (iii)}}{\text{number of moles of diisocyanate (i)} - \text{number of moles of anhydride (ii)}}$$

ranges from 0.5 to 1.

DETAILED DESCRIPTION OF THE PREFERRED EMBODIMENTS OF THE INVENTION

More particularly according to the present invention, it will be appreciated that the formula for the subject block copolymers, if $B_1$ is an (imide/amide) block of the formula (I) and $B_2$ is a (urea/siloxane) block of the formula (II), is essentially as follows:

where p represents a positive number ranging from 1 to 100.

Exemplary of the diisocyanate (i) of the formula (IV), the following are particularly representative:
4,4′-diisocyanato-2,2-diphenylpropane;
4,4′-diisocyanato-diphenylmethane;
4,4′-diisocyanato-biphenyl;
4,4′-diisocyanato-diphenyl sulfide;
4,4′-diisocyanato-diphenyl sulfone;
4,4′-diisocyanato-diphenyl ether; and
4,4′-diisocyanato-1,1-diphenylcyclohexane.

Preferably, 4,4′-diisocyanato-diphenylmethane and 4,4′-diisocyanato-diphenyl ether are used to carry out the present invention.

By way of specific examples of the tricarboxylic acid monoanhydrides (ii) of the formula (V), the following are particularly representative:
trimellitic acid monoanhydride;
naphthalene-2,3,6-tricarboxylic acid 2,3-monoanhydride;
naphthalene-1,8,4-tricarboxylic acid 1,8-monoanhydride;
naphthalene-1,2,5-tricarboxylic acid 1,2-monoanhydride;
diphenyl-3,3,4′-tricarboxylic acid 3,4-monoanhydride;
diphenyl sulfone-3,4,3′-tricarboxylic acid 3,4-monoanhydride;
diphenyl ether 3,4,4′-tricarboxylic acid 3,4-monoanhydride;
benzophenone-3,4,4′-tricarboxylic acid 3,4-monoanhydride; and
diphenyl-isopropylidene-3,4,4′-tricarboxylic acid 3,4-monoanhydride.

Preferably, trimellitic acid monoanhydride is used according to the present invention.

As regards the diamine siloxanes (iii) of the formula (VI), if y and/or z are greater than 1, these are compounds having a polymeric structure and rarely a single compound, but mostly commonly a mixture of compounds of the same chemical structure, which differ in respect of the number of recurring units in their molecule. Thus, resulting is a mean value of y and/or z, which can be integral or fractional.

Preferred diamines of the formula (VI) are those in which:

(1) X=—O—; $R_1$, $R_2$, $R_3$, $R_4$ and $R_5$, which may be identical or different, are each a linear or branched chain alkyl radical having from 1 to 6 carbon atoms; x=2, 3, 4 or 5; y+z ranges from 0 to 100 and preferably from 4 to 70;

(2) X=—O—; $R_1$, $R_2$ and $R_3$, which may be identical or different, are each a linear or branched chain alkyl radical having from 1 to 6 carbon atoms; $R_4$ and $R_5$ are each a phenyl radical; x=2, 3, 4 or 5; y+z ranges from 0 to 100 and preferably from 4 to 70;

(3) X=—O—, $R_1$, $R_2$ and $R_4$, which may be identical or different, are each a linear or branched chain alkyl radical having from 1 to 6 carbon atoms; $R_3$ and $R_5$ are each a phenyl radical; x=2, 3, 4 or 5; y+z ranges from 0 to 100 and preferably from 4 to 70; and (4) X=—O—; $R_1$ is a linear or branched chain alkyl radical having from 1 to 6 carbon atoms; $R_2$, $R_3$, $R_4$ and $R_5$ are each a phenyl radical; x=2, 3, 4 or 5; y+z ranges from 0 to 100 and preferably from 4 to 70.

Even more preferred diamines are those of the formula (VI) in which:

(5) X=—O—; $R_1=R_2=R_3=R_4=R_5=$ a linear alkyl radical having from 1 to 3 carbon atoms; x=2, 3 or 4; y+z ranges from 0 to 100 and preferably from 4 to 70;

(6) X=—O—; $R_1=R_2=R_3=$ a linear alkyl radical having from 1 to 3 carbon atoms; $R_4=R_5=$ a phenyl radical; x=2, 3 or 4; y+z ranges from 0 to 100 and preferably from 4 to 70;

(7) X=—O—; $R_1=R_2=R_4=$ a linear alkyl radical having from 1 to 3 carbon atoms; $R_3=R_5=$ a phenyl radical; x=2, 3 or 4; y+z ranges from 0 to 100 and preferably from 4 to 70; and (8) X=—O—; $R_1=$ a linear alkyl having from 1 to 3 carbon atoms; $R_2=R_3=R_4=R_5=$ a phenyl radical; x=2, 3 or 4; y+z ranges from 0 to 100 and preferably from 4 to 70.

Very particularly preferred amines are those of the formula (VI) in which:

(9) X=—O—; $R_1=R_2=R_3=R_4=R_5=$ a methyl radical; x=3; y+z ranges from 0 to 100 and preferably from 4 to 70;

(10) X=—O—; $R_1=R_2=R_3=$ a methyl radical; $R_4=R_5=$ a phenyl radical; x=3; y+z ranges from 0 to 100 and preferably from 4 to 70.

(11) X=—O—; $R_1=R_2=R_4=$ a methyl radical; $R_3=R_5=$ a phenyl radical; x=3; y+z ranges from 0 to 100 and preferably from 4 to 70; and

(12) X=—O—; $R_1=$ a methyl radical; $R_2=R_3=R_4R_5=$ a phenyl radical; x=3; y+z ranges from 0 to 100 and preferably from 4 to 70.

Specific examples of diamine siloxanes which are very particularly representative are:

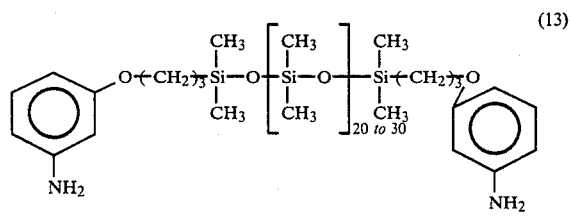
(13)

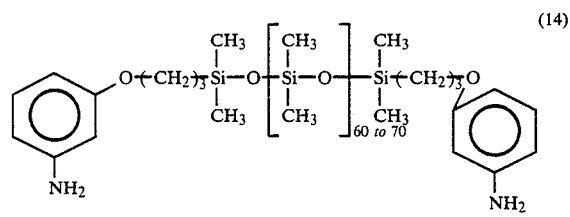
(14)

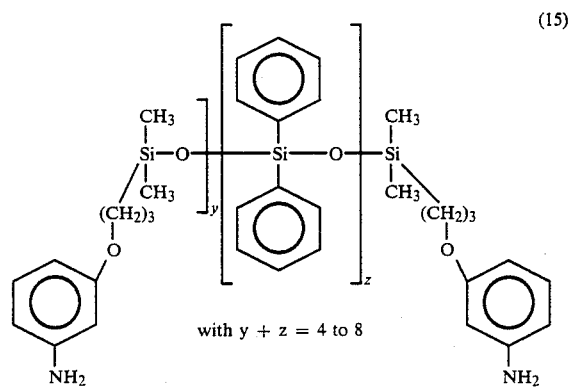
(15)
with y + z = 4 to 8

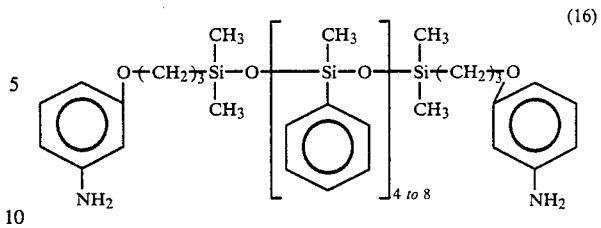
(16)

The diamines (iii) of the formula (VI) are preferably those wherein the diorganopolysiloxane group contains both Si-alkyl (or substituted Si-alkyl) bonds and Si-phenyl (or substituted Si-phenyl) bonds. Compounds of this type which are suitable are those belonging to the following groups classified in increasing order of preference:

Compounds No. 2, 3 and 4;
Compounds No. 6, 7 and 8;
Compounds No. 10, 11 and 12.

The diamines (iii) of the formula (VI) having a diorganopolysiloxane group are compounds which are well known to this art. They are described, for example, in British Patent No. 1,062,418 and U.S. Pat. No. 4,395,527.

In these patents, a first method of preparation of these diamines, which is in particular applicable if it is desired to produce a compound of the formula (VI) where y=z=0, namely, if it is desired to produce a diamine having a diorganopolysiloxane group, consists of reacting a compound of the formula:

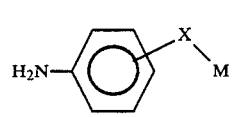

wherein X is as defined above and M is an alkali metal or an alkaline earth metal, with a bis(halogenoalkyl)-disiloxane of the formula:

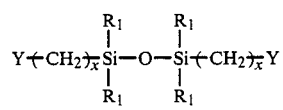

wherein x is as defined above and Y is a chlorine, bromine or iodine atom, at a temperature of from 20° to 200° C. in the presence of an aprotic polar solvent.

In the case where it is desired to produce a diamine (iii) of the formula (VI) where y and/or z are other than zero, a second described method consists of copolymerizing one mole of diamine having a diorganopolysiloxane group, prepared as indicated above, with an amount of one or more cyclic diorganopolysiloxanes capable of providing y moles of siloxy groups of the formula:

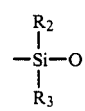

and/or z moles of siloxy groups of the formula:

In general the reaction is conducted at a temperature of from 80° to 250° C. in the presence, once again, of a solvent and optionally of a suitable catalyst.

Another method for preparing the diamines (iii) of the formula (VI), with y and/or z being equal to zero or other than zero, is to react an ethylenically unsaturated compound of the formula:

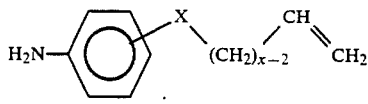

in which X, which is in the ortho-, meta- or para-position relative to the carbon atom of the benzene ring bonded to the nitrogen, and x are as defined above, with an alpha, omega-bis(hydrogeno)diorganopolysiloxane of the formula:

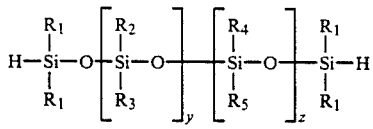

in which $R_1$, $R_2$, $R_3$, $R_4$, $R_5$, y and z are also as defined above. This hydrosilylation reaction is carried out by reaction in bulk, in the absence of a solvent, and using a platinum-based catalyst. The alpha, omega-bis(hydrogeno)diorganopolysiloxanes employed are products which are well known in the silicone industry and are in certain cases commercially available. They are described, for example, in French Patents Nos. 2,486,952 and 2,058,988.

When employing this hydrosilylation reaction for preparing a diamine (iii) of the formula (VI), the ethylenically unsaturated amine substrate which is well suited for reaction with the alpha, omega-bis(hydrogeno)diorganopolysiloxane is, in particular, an allyloxyaniline of the formula:

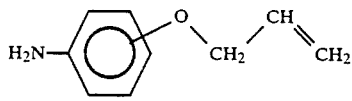

Under these special conditions, one thus obtains diamines (iii) of the formula (VI) where X=—O—, x=3 and $R_1$, $R_2$, $R_3$, $R_4$, $R_5$, y and z have the general or specific definitions given above.

The reaction in stage (a) of the process for preparing the copolymers according to the present invention is carried out in a homogeneous medium by adding, to the reactants (i) and (ii), a solvent or mixture of solvents common to the reactants and to the product formed. Solvents which are very suitable are polar solvents, in particular N,N-dimethylacetamide, N,N-dimethylformamide, N-methyl-pyrrolid-2-one, dimethyl sulfoxide and a mixture of these solvents; they must furthermore be completely anhydrous. The polymerization reaction is carried out at a temperature of from 50° C. to 200° C.

Best results are obtained at temperatures of from 90° C. to 160° C. Preferably, the proportions of reactants (i) and (ii) are selected such that the ratio:

$$\frac{\text{number of moles of diisocyanate (i)}}{\text{number of moles of anhydride (ii)}}$$

is in the range of from 1.1 to 1.5. In general, if the reaction is carried out at a temperature of from 90° C. to 160° C., all the functional groups of the anhydride (ii) have reacted after 2 to 3 hours. In practice, the starting reactants are dissolved in the solvent or solvents, where appropriate at an elevated temperature, after which the solution obtained is adjusted to the desired temperature either directly or gradually, under normal pressure or under a suitable vacuum.

In stage (b), the diaminesiloxane (iii) can be employed in the form of a solution in a solvent or mixture of solvents such as those mentioned above in relation to stage (a). This second stage is carried out at a temperature ranging from 90° C. to 120° C. More preferably, the proportions of diamine (iii) are selected such that the ratio:

$$\frac{\text{number of moles of diaminesiloxane (iii)}}{\text{number of moles of diisocyanate (i)} - \text{number of moles of anhydride (ii)}}$$

is in the range of from 0.65 to 0.95. In general, if the reaction is carried out at a temperature of from 90° C. to 120° C., all the amino groups have reacted after 1 hour, 30 minutes to 2 hours.

At the end of stage (b), the copolymer is obtained in the form of a solution. It can be precipitated by adding a nonsolvent or a mixture of nonsolvents to the reaction mixture and separating the precipitated copolymer from the reaction mixture. Suitable nonsolvents are, for example, water, acetone, tetrahydrofuran, toluene or any other solvent which does not dissolve the desired copolymer. It is also possible to obtain the copolymer by evaporating the solvent or solvents from the reaction mixture in a ventilated oven.

These copolymers are well suited for the production of, in particular, fibers, coating films and insulating varnishes, either during evaporation or subsequently.

In order to further illustrate the present invention and the advantages thereof, the following specific examples are given, it being understood that same are intended only as illustrative and in nowise limitative.

EXAMPLE 1

1. The following procedure was carried out:
1.1 Stage (a):

Into a glass reactor equipped with an anchor-type stirrer and a reflux condenser, in which reactor a slight excess pressure of dry nitrogen had been established and which was preheated to 100° C. with a suitable oil bath, there were introduced successively:

7 g (0.0365 mole) of trimellitic acid monoanhydride;

11.9 g (0.0472 mole) of 4,4'-diisocyanato-diphenyl ether; and 63 g of N-methyl-pyrrolid-2-one.

The mixture was allowed to react for 2 hours, under stirring. After this time, the reaction temperature was raised to 130° C. and the reaction was allowed to proceed for an additional hour, under stirring. The temperature of the reaction mixture was then lowered to 100° C. in order to perform stage (b).

Infrared spectrometry showed the presence, in the reaction mixture, of imide C=O bands at =1710−1770 cm$^{-1}$ and the absence of the anhydride C=O band at =1850 cm$^{-1}$.

1.2 Stage (b):

To the reaction mixture obtained at the end of stage (a) were added 9 g (0.0072 mole) of the diamine having a diorganopolysiloxane group, described in paragraph 2 below, this diamine being employed in the form of a solution in 48.6 g of N-methyl-pyrrolid-2-one. The mixture was allowed to react for 2 hours at 100° C., under stirring.

The copolymer solution thus obtained was a liquid mass having a dark red color and weighing 136 g (it contained 24.7 g of copolymer). Infrared analysis did not show any primary amine in the solution obtained; the degree of conversion of the diamine employed was accordingly 100%.

The copolymer, prepared in solution form, comprised:

(imide/amide) blocks of the formula:

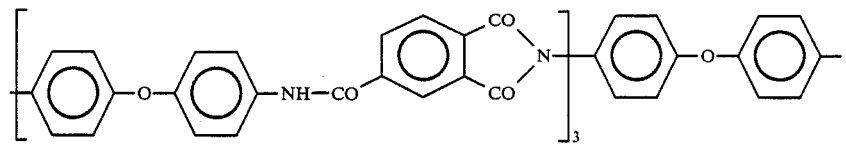

and (urea/siloxane) blocks of the formula:

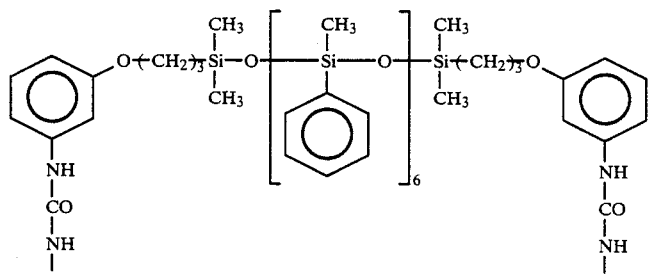

The copolymer solution was used to coat a 5 cm long sliver of desized glass, of type E. This impregnated sliver was dried under a vacuum of 53.2×10$^2$ pa at 120° C. for 12 hours. This sliver was then subjected to a dynamic torsional stress by means of a fiber pendulum. The variation of rigidity of the sample as a function of the temperature was thus measured, making it possible to determine the glass transition temperatures (Tg) of the material. The values obtained were as follows:

Tg of the (urea/siloxane) blocks: −40° C.
Tg of the (imide/amide) blocks: 160° C.

2. The following is a description of the process for the preparation of the above diamine having a diorganopolysiloxane group.

This diaminesiloxane had the following formula:

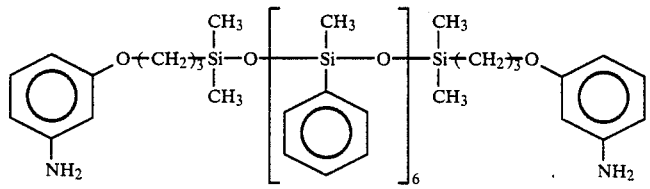

Into a glass reactor equipped with a central stirrer, a dropping funnel and a reflux condenser, in which reactor a slight excess pressure of dry nitrogen was established, there were introduced 346.3 g (0.37 mole) of an alpha, omega-bis(hydrogeno)polysiloxane of the formula:

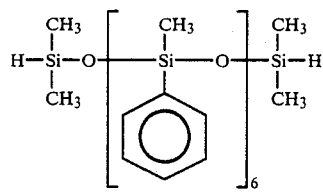

having a molecular weight on the order of 936 g.

The reactor was then introduced into an oil bath preheated to 55° C., after which the catalyst was added. The latter was a Karsted catalyst (a complex based on elementary platinum and 1,3-divinyl-1,1,3,3-tetramethyl-disiloxane ligands): it was in solution in toluene (at a concentration of 3.5% by weight) and 2.05 cm$^3$ of this catalyst solution were introduced with a syringe; the ratio r (weight of elementary platinum employed/weight of the reaction mixture) was 130.10$^{-6}$.

Thereafter, 110.3 g (0.74 mole) of meta-allyloxyaniline were run into the reactor over a period of 60 minutes such as to control the exothermicity of the reaction. Thirty minutes upon completion of this addition, the mixture returned to ambient temperature. The product obtained, weighing 456.5 g, was a limpid viscous oil of orange-brown color, and it exhibited a proton NMR spectrum in agreement with the structure of the diamine given above. The molecular weight was on the order of 1248 g.

EXAMPLE 2

1. Stage (a):

Into the reactor used in Example 1 there were introduced successively, at 100° C.:

11.9 g (0.062 mole) of trimellitic acid monoanhydride;
18.1 g (0.0718 mole) of 4,4'-diisocyanato-diphenyl ether; and
70 g of N-methyl-pyrrolid-2-one.

The mixture was allowed to react for 1 hour at 100° C. followed by 1 hour at 125° C. and 1 hour at 150° C. The temperature then was lowered to 100° C. such as to enable carrying out stage (b).

Infrared spectrometry showed, as in Example 1, the presence in the reaction mixture of C=O imide bands at $=1710-1770$ cm$^{-1}$ and the absence of the C=O anhydride band at 1850 cm$^{-1}$.

2. Stage (b):

To the reaction mixture obtained at the end of stage (a) were added 10 g (0.0080 mole) of the diamine having a diorganopolysiloxane group, described above in Example 1, this diamine being again employed in the form of a solution in 90 g of N-methyl-pyrrolid-2-one. The mixture was allowed to react, under stirring, for 2 hours at 100° C.

The copolymer solution thus obtained was a liquid mass having a dark red color and weighing 194 g (it contained 34.5 g of copolymer). Once again, the degree of conversion of the diamine employed was 100%.

The copolymer which had been prepared in the form of a solution comprised:

(imide/amide) blocks of the formula:

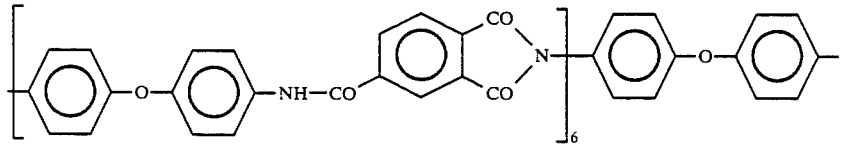

and (urea/siloxane) blocks of the formula:

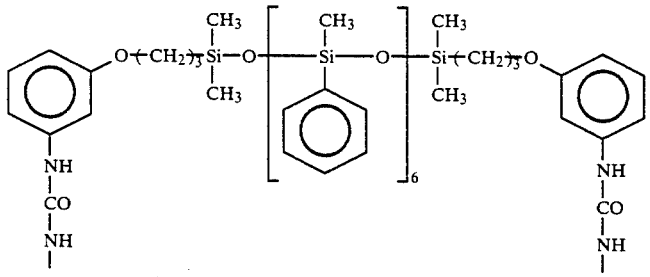

The Tg values of the copolymer, measured as indicated in Example 1, were as follows:
Tg of the (urea/siloxane) blocks: $-40°$ C.
Tg of the (imide/amide) blocks: 210° C.

A film was prepared from the copolymer solution obtained. The solution was cast onto a glass plate as an 0.4 mm thick layer. The plate was placed in an oven and heated at 100° C. under a vacuum of 53.2×10 for 12 hours.

An opaque yellow film was obtained, which detached easily from the support and which had the following mechanical tensile properties (measured in accordance with the instructions of Standards Specification ASTM D 882):

Tensile modulus: 1200 MPa
Tensile strength: 65 MPa
Elongation at break: 35%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermally stable block copolymer comprising recurring imide/amide blocks of the formula:

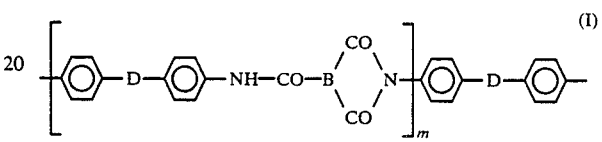

in which:

D represents a simple valence bond or one of the groups selected from:

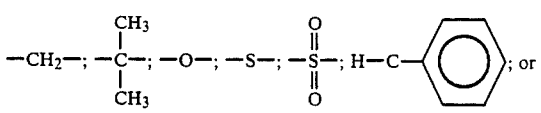

B represents a trivalent substituted or unsubstituted aromatic radical, or two such radicals joined together by a simple valence bond or one of the groups selected from:

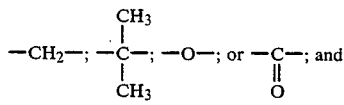

m is a positive number equal to at least 1; and recurring urea/siloxane blocks of the formula:

—NH—CO—NH—A—NH—CO—NH—  (II)

in which:
A represents a divalent diorganosiloxane radical of the formula:

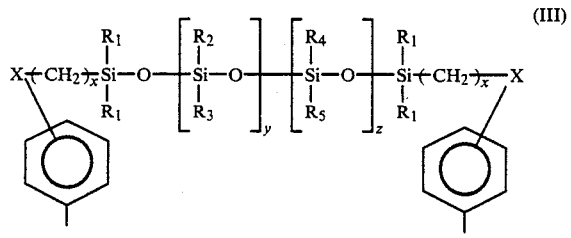

in which:
X, which is in the ortho, meta- or para-position relative to the carbon atoms of the benzene ring with the valence bond depending therefrom, represents one of the following atoms or groups selected from:

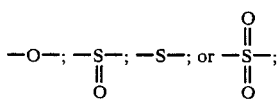

$R_1$, $R_2$, $R_3$, $R_4$ and $R_5$, which may be identical or different, are each a linear or branched chain alkyl radical having from 1 to 12 carbon atoms, or a substituted such alkyl radical bearing one or more chlorine, bromine or fluorine atom substituents or a —CN group substituent, or a phenyl radical optionally substituted by one or more alkyl and/or alkoxy radicals having from 1 to 4 carbon atoms or by one or more chlorine atoms;
the symbol x is an integer ranging from 2 to 8; and
the symbols y and z represent identical or different integral or fractional numbers, the sum of which ranges from 0 to 100.

2. The thermally stable block copolymer as defined by claim 1, wherein the formula (I), m ranges from 1 to 10.

3. A thermally stable block copolymer as defined by claim 1, obtained by (a) heating a (i) diisocyanate of the formula:

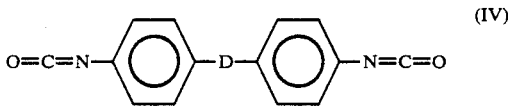

with (ii) a tricarboxylic acid monoanhydride of the formula:

at a temperature ranging from 50° C. to 200° C., in the presence of an organic solvent or a mixture of organic solvents, the proportions of the reactants (i) and (ii) being such that the ratio:

$$\frac{\text{number of moles of diisocyanate (i)}}{\text{number of moles of anhydride (ii)}}$$

ranges from 1.1 to 2, and for such period of time that all of the functional groups of said anhydride (ii) have reacted, thus producing an oligomer having terminal isocyanate groups; and (b) thence reacting the stage (a) reaction mixture, containing said oligomer having terminal isocyanate groups, at a temperature ranging from 50° C. to 160° C., with (iii) a diamine which comprises a diorganopolysiloxane bridge having the formula:

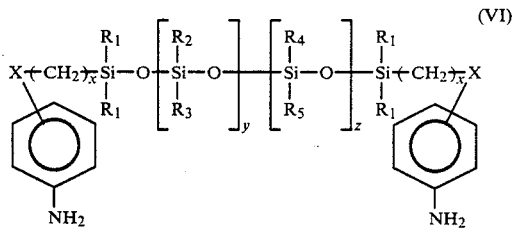

in which X, $R_1$, $R_2$, $R_3$, $R_4$, $R_5$, x, y and z are as defined above in formula (III), with the proportions of reactant (iii) being such that the ratio:

$$\frac{\text{number of moles of diaminesiloxane (iii)}}{\text{number of moles of diisocyanate (i) } - \text{number of moles of anhydride (ii)}}$$

ranges from 0.5 to 1.

4. A thermally stable block copolymer as defined by claim 3, said diisocyanate (i) of the formula (IV) comprising 4,4′-diisocyanato-2,2-diphenylpropane, 4,4′-diisocyanato-diphenylmethane, 4,4′-diisocyanato-biphenyl, 4,4′-diisocyanato-diphenyl sulfide, 4,4′-diisocyanato-diphenyl sulfone, 4,4′-diisocyanato-diphenyl ether, or 4,4′-diisocyanato-1,1-diphenyl-cyclohexane.

5. A thermally stable block copolymer as defined by claim 3, said tricarboxylic acid monoanhydride (2i) of the formula (V) comprising trimetallic acid monoanhydride, naphthalene-2,3,6-tricarboxylic acid 2,3-monoanhydride, naphthalene-1,8,4-tricarboxylic acid 1,8-monoanhydride, naphthalene-1,2,5-tricarboxylic acid 1,2-monoanhydride, diphenyl-3,4,4′-tricarboxylic acid 3,4-monoanhydride, diphenyl sulfone-3,4,3-tricarboxylic acid 3,4-monoanhydride, diphenyl ether 3,4,4′-tricarboxylic acid 3,4-monoanhydride, benzophenone-3,4,4′-tricarboxylic acid 3,4-monoanhydride, or diphenyl-isopropylene-3,4,3′-tricarboxylic acid 3,4-monoanhydride.

6. A thermally stable block copolymer as defined by claim 3, said diamine (iii) of the formula (VI) comprising a diorganopolysiloxane group containing both Si-alkyl or substituted Si-alkyl bonds and Si-phenyl or substituted Si-phenyl bonds.

7. A thermally stable block copolymer as defined by claim 6, wherein said diamine (iii) of the formula (VI):
X=—O—; $R_1$, $R_2$ and $R_3$, which may be identical or different, are each a linear or branched chain alkyl radical having from 1 to 6 carbon atoms; $R_4$ and $R_5$ are each a phenyl radical; x=2, 3, 4 or 5; and y+z ranges from 0 to 100.

8. A thermally stable block copolymer as defined by claim 6, wherein said diamine (iii) of the formula (VI):
X=—O—; $R_1$, $R_2$ and $R_4$, which may be identical or different, are each a linear or branched chain alkyl radical having from 1 to 6 carbon atoms; $R_3$ and $R_5$ are each a phenyl radical; x=2, 3, 4 or 5; and y+z ranges from 0 to 100.

9. A thermally stable block copolymer as defined by claim 6, wherein said diamine (iii) of the formula (VI):
X=—O—; $R_1$ is a linear or branched chain alkyl radical having from 1 to 6 carbon atoms; $R_2$, $R_3$, $R_4$ and $R_5$ are each a phenyl radical; x=2, 3, 4 or 5; and y+z ranges from 0 to 100.

10. A thermally stable block copolymer as defined by claim 3, said reaction solvent comprising N,N-dimethylacetamide, N,N-dimethylformamide, N-methylpyrrolid-2-one, dimethyl sulfoxide, or mixture thereof.

* * * * *